S. VAN EMON, Dec'd.

L. C. GOODALE, Administrator.

HYDROSTATIC HOISTING-MACHINE.

No. 7,438. Reissued Dec. 19, 1876.

Witnesses.

L. H. Latimer

H. J. Pratt

Inventor.

Levi C. Goodale

Admr. Estate Samuel Van Emon per Lawrence & Gregory Attys

UNITED STATES PATENT OFFICE.

LEVI C. GOODALE, OF CINCINNATI, OHIO, ADMINISTRATOR OF SAMUEL VAN EMON, DECEASED.

IMPROVEMENT IN HYDROSTATIC HOISTING-MACHINES.

Specification forming part of Letters Patent No. 134,019, dated December 17, 1872; reissue No. 7,438, dated December 19, 1876; application filed November 27, 1876.

*To all whom it may concern:*

Be it known that SAMUEL VAN EMON, late of Cincinnati, Hamilton county, Ohio, have invented a certain new and useful Improvement in Hydraulic Elevators or Hoisting-Machines, of which the following is a specification:

The invention has reference to the combination, with the hoisting-rope, of an elevator and localized and movable pulleys of a cylinder, a piston attached to the cross-head, and one or more concentric cylindrical pistons, whereby one, two, or more pistons may be used to raise the load, or, in other words, the size or effective area of piston-surface may be adapted to the weight of the load, and the use of a large cylinder full of water to raise a load, which could be efficiently raised by the expenditure of a small cylinder full is avoided.

The invention also relates to means for securing the piston or pistons not brought into service to raise the load, whereby the piston or pistons not operating to raise the load may remain depressed within the stationary cylinder.

Figure 1:
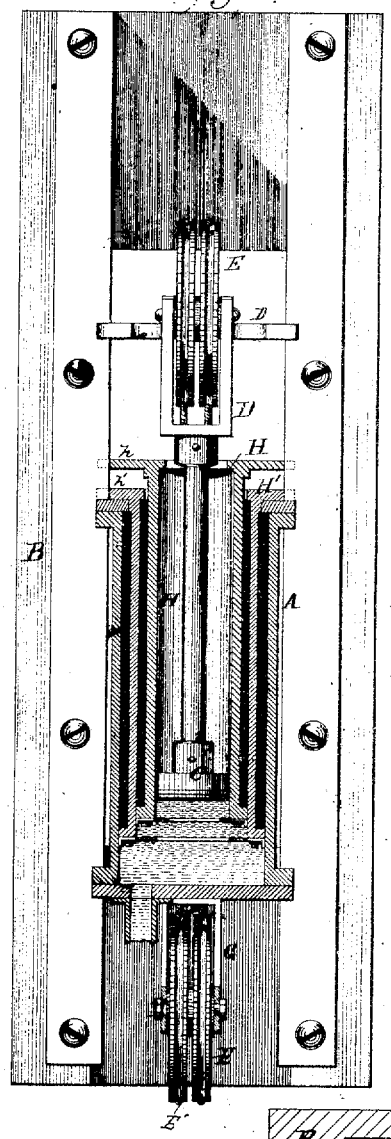
Figure 2:
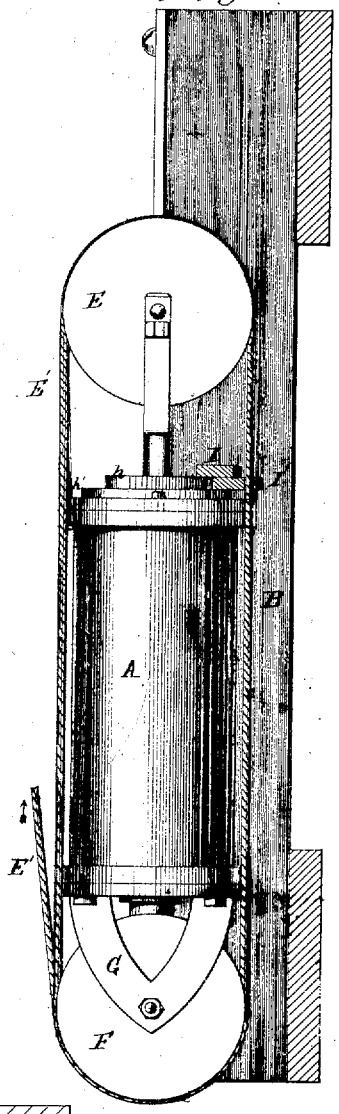
Figure 3:
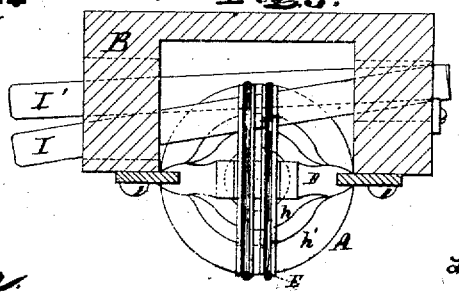

Figure 1 is a plan, in section, of a water-elevator, embodying the invention. Fig. 2 is a side elevation of the same; and Fig. 3 a cross-section.

A is the outer or stationary cylinder, bolted to the customary bed B. C is the main piston, connected to the cross-head D, which serves as a bearing for one or more pulleys or sheaves, E, the rope E′ of which connects at one end to the cylinder A, or other stationary object, and after passing over the pulleys or sheaves F localized on a stationary bearing, G, connects with the hoisting-platform in such a way that a slight movement of the piston or pistons will cause the platform to move through a much greater distance. Between the piston C and the outer stationary cylinder A is introduced one or more annular auxiliary pistons, H H′. The piston H forms a cylinder, in which moves the piston C. The piston H′ forms a cylinder for the piston H, and H′ fits the cylinder A. The pistons H H′ are provided with packing at their inner ends, the one to fit the interior of the piston H′, and the other to fit the outer cylinder A. The outer end of each piston H H′ is provided with an outwardly-projecting flange, *h h′*. The end of piston H, in which the piston C is fitted, when not held down by the holder I, will act with piston C to assist in lifting the cross-head D, and if piston H′ is liberated from the control of its holder I′, then it will also act to assist in the movement of the cross-head. The piston area denoted by piston C may be increased or regulated through the action of the auxiliary tubular concentric pistons H H′, which are so arranged that they may either play in conjunction with the piston C, or remain inactive in the stationary cylinder A. For each tubular piston a separate holding or locking device is provided, and it is preferred to employ the following means for this purpose:

The flanges *h h′* of the pistons H H′ are of unequal sizes, so as to enable the holders or levers I I′ to be brought into such a position that they will stop the pistons H H′, to which they belong, and permit the piston C to alone move to raise a light load placed upon the platform. If holder I is turned away from piston H, the piston C and the piston H will move together to raise a heavier load, the piston H co-operating with piston C, giving a greater area of effective piston-surface. If both the holders I I′ are released then all the pistons will be permitted to move together to give sufficient area to raise the heaviest load on the platform. Thus the area on the piston-surface on which the water acts can be made to correspond nearly to the work required to be done, and only so much water is used as the work requires.

The cylinder A is fed with water in the ordinary way, and the water is discharged through a suitable valve-governed aperture to permit the platform to descend.

What is claimed is—

1. In a hydraulic elevator a movable cross-head, a rope to be operated by it, and a main piston connected with the cross-head, in combination with one or more auxiliary pistons, adapted to move with the main piston and cross-head to start and lift a heavy load, or to remain inactive while the main piston completes its full stroke, the single main piston, or it and an auxiliary piston, being adapted to be thrown into operative action according to the weight of the load to be raised.

2. In an elevator a hoisting-rope, localized pulleys, movable pulleys, and a cross-head, in combination with an outer stationary cylinder, a piston attached to the cross-head, and one or more cylindrical pistons, adapted to either remain inactive, or to be caused to act in conjunction with the piston attached to the cross head, to decrease or increase the effective area of the piston-surface for a light or a heavy load.

3. The combination, with a stationary outer cylinder and localized pulleys, a cross-head, and movable pulleys, a piston attached to the cross-head, and one or more concentric cylindrical pistons, of one or more holders, whereby the piston or pistons not attached to the cross-head may be retained, depressed within the stationary cylinder, or be elevated by the action of the water, to add to the effective area of the piston-surface.

LEVI C. GOODALE,
*Administrator of estate of Saml. Van Emon, deceased*

Witnesses:
A. P. FARWELL,
M. A. STINCHFIELD.